(12) United States Patent  
Kapinos et al.

(10) Patent No.: US 10,747,574 B2  
(45) Date of Patent: Aug. 18, 2020

(54) EXECUTING APPLICATIONS PRIOR TO USER LOGIN

(71) Applicant: LENOVO (Singapore) PTE. LTD., New Tech Park (SG)

(72) Inventors: Robert James Kapinos, Durham, NC (US); Timothy Winthrop Kingsbury, Cary, NC (US); Scott Wentao Li, Cary, NC (US); Russell Speight VanBlon, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 177 days.

(21) Appl. No.: 15/918,992

(22) Filed: Mar. 12, 2018

(65) Prior Publication Data

US 2019/0278627 A1   Sep. 12, 2019

(51) Int. Cl.

| | |
|---|---|
| *G06F 9/46* | (2006.01) |
| *G06F 9/48* | (2006.01) |
| *G06N 5/04* | (2006.01) |
| *G06F 21/31* | (2013.01) |

(52) U.S. Cl.
CPC .......... *G06F 9/4843* (2013.01); *G06F 21/316* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 2011/0004749 A1* | 1/2011 | Bennetts | G06F 1/3203 713/100 |
| 2017/0178048 A1* | 6/2017 | Ghotbi | G06Q 10/063114 |
| 2018/0183775 A1* | 6/2018 | Malkapuram | G06F 21/31 |
| 2019/0310861 A1* | 10/2019 | Wei | G06F 9/4403 |

\* cited by examiner

*Primary Examiner* — Diem K Cao

(74) *Attorney, Agent, or Firm* — Kunzler Bean & Adamson

(57) ABSTRACT

Apparatuses, methods, systems, and program products are disclosed for executing applications prior to user login. A method includes tracking, by a processor, a user's usage pattern of an information handling device over a period of time while the user uses the information handling device. The method includes predicting a time that the user is likely to login to the information handling device based on the user's usage pattern of the information handling device. The method includes executing one or more applications that the user is likely to use at the predicted time, based on the user's usage pattern, prior to the user logging into information handling device.

20 Claims, 5 Drawing Sheets

EXECUTING APPLICATIONS PRIOR TO USER LOGIN

FIELD

The subject matter disclosed herein relates to logging into a device and more particularly relates to executing applications for a user prior to the user logging into a device.

BACKGROUND

When a user logs into a device, the user typically executes one or more applications manually as part of the process of getting the device ready to use. The user then has to wait for the applications to launch to a ready state. The user may then manually open documents, web pages, and/or the like to use within each application, which forces the user to wait an additional amount of time before the user can use the applications.

BRIEF SUMMARY

An apparatus for executing applications prior to user login is disclosed. The apparatus, in one embodiment, includes an information handling device, a processor of the information handling device, and a memory that stores code executable by the processor. In one embodiment, the memory stores code executable by the processor to track a user's usage pattern of the information handling device over a period of time while the user uses the information handling device. In a further embodiment, the memory stores code executable by the processor to predict a time that the user is likely to login to the information handling device based on the user's usage pattern of the information handling device. In certain embodiments, the memory stores code executable by the processor to execute one or more applications that the user is likely to use at the predicted time, based on the user's usage pattern, prior to the user logging into information handling device.

A method for executing applications prior to user login, in one embodiment, includes tracking, by a processor, a user's usage pattern of an information handling device over a period of time while the user uses the information handling device. The method, in a further embodiment, includes predicting a time that the user is likely to login to the information handling device based on the user's usage pattern of the information handling device. The method, in certain embodiments, includes executing one or more applications that the user is likely to use at the predicted time, based on the user's usage pattern, prior to the user logging into information handling device.

A program product for executing applications prior to user login, in one embodiment, includes a computer readable storage medium that stores code executable by a processor. In some embodiments, the executable code includes code to perform tracking a user's usage pattern of an information handling device over a period of time while the user uses the information handling device. The executable code, in certain embodiments, includes code to perform predicting a time that the user is likely to login to the information handling device based on the user's usage pattern of the information handling device. The executable code, in certain embodiments, includes code to perform executing one or more applications that the user is likely to use at the predicted time, based on the user's usage pattern, prior to the user logging into information handling device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
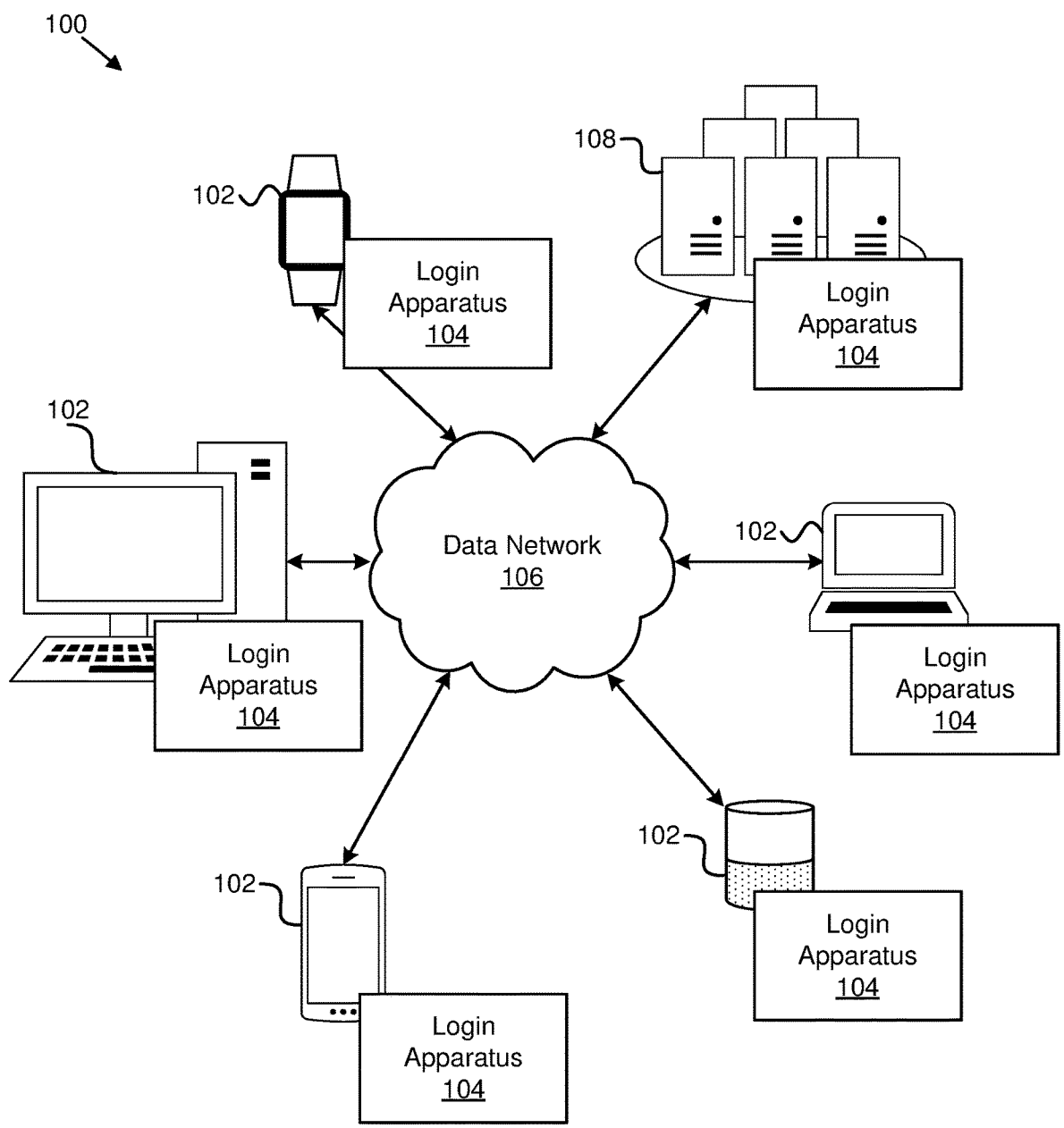
FIG. 1 is a schematic block diagram illustrating one embodiment of a system for executing applications prior to user login.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for executing applications prior to user login is disclosed. The apparatus, in one embodiment, includes an information handling device, a processor of the information handling device, and a memory that stores code executable by the processor. In one embodiment, the memory stores code executable by the processor to track a user's usage pattern of the information handling device over a period of time while the user uses the information handling device. In a further embodiment, the memory stores code executable by the processor to predict a time that the user is likely to login to the information handling device based on the user's usage pattern of the information handling device. In certain embodiments, the memory stores code executable by the processor to execute one or more applications that the user is likely to use at the predicted time, based on the user's usage pattern, prior to the user logging into information handling device.

In one embodiment, the one or more applications are executed in a background process of an operating system executing on the information handling device. In certain embodiments, the one or more applications are executed in response to one of a login screen being presented to the user and a startup event for the information handling device being detected. In various embodiments, the user's usage pattern of the information handling device is tracked according to one or more of the user executing an application, on an on-going basis, and at predefined intervals.

In one embodiment, the memory stores code executable by the processor to provide credentials to one or more applications that require credentials for authenticating the user to use the one or more applications. In certain embodiments, the memory stores code executable by the processor to execute one or more services for an operating system executing on the information handling device prior to the user logging into the information handling device.

In further embodiments, the memory stores code executable by the processor to restore a state of the one or more applications, based on the user's usage pattern, in response to the one or more applications being executed prior to the user logging into the information handling device. In one embodiment, restoring the state of the one or more applications comprises one or more of opening websites that the user is likely to view, opening documents that the user is likely to use, and positioning application windows in a graphical user interface at locations where the user is likely to place the application windows.

In certain embodiments, the one or more applications are executed prior to the user logging into an operating system executing on the information handling device. In some embodiments, tracking the user's usage pattern comprises tracking a schedule of when the user one or more of actively uses an application, executes an application, opens a webpage, opens a document, and provides credentials for authentication.

A method for executing applications prior to user login, in one embodiment, includes tracking, by a processor, a user's usage pattern of an information handling device over a period of time while the user uses the information handling device. The method, in a further embodiment, includes predicting a time that the user is likely to login to the information handling device based on the user's usage pattern of the information handling device. The method, in certain embodiments, includes executing one or more applications that the user is likely to use at the predicted time, based on the user's usage pattern, prior to the user logging into information handling device.

In one embodiment, the method includes executing the one or more applications in a background process of an operating system executing on the information handling device. In some embodiments, the method includes executing the one or more applications in response to one of presenting a login screen to the user and detecting a startup event for the information handling device. In certain embodiments, the user's usage pattern of the information handling device is tracked according to one or more of the user executing an application, on an on-going basis, and at predefined intervals.

In one embodiment, the method includes providing credentials to one or more applications that require credentials for authenticating the user to use the one or more applications. In certain embodiments, the method includes executing one or more services for an operating system executing on the information handling device prior to the user logging into the information handling device. In some embodiments, the method includes restoring a state of the one or more applications, based on the user's usage pattern, in response to the one or more applications being executed prior to the user logging into the information handling device.

In one embodiment, restoring the state of the one or more applications comprises one or more of opening websites that the user is likely to view, opening documents that the user is likely to use, and positioning application windows in a graphical user interface at locations where the user is likely to place the application windows. In further embodiments, tracking the user's usage pattern comprises tracking a schedule of when the user one or more of actively uses an application, executes an application, opens a webpage, opens a document, and provides credentials for authentication.

A program product for executing applications prior to user login, in one embodiment, includes a computer readable storage medium that stores code executable by a processor. In some embodiments, the executable code includes code to perform tracking a user's usage pattern of an information handling device over a period of time while the user uses the information handling device. The executable code, in certain embodiments, includes code to perform predicting a time that the user is likely to login to the information handling device based on the user's usage pattern of the information handling device. The executable code, in certain embodiments, includes code to perform executing one or more applications that the user is likely to use at the predicted time, based on the user's usage pattern, prior to the user logging into information handling device.

FIG. 1 is a schematic block diagram illustrating one embodiment of a system 100 for executing applications prior to user login. In one embodiment, the system 100 includes one or more information handling devices 102, one or more login apparatuses 104, one or more data networks 106, and one or more servers 108. In certain embodiments, even though a specific number of information handling devices 102, login apparatuses 104, data networks 106, and servers 108 are depicted in FIG. 1, one of skill in the art will recognize, in light of this disclosure, that any number of information handling devices 102, login apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a micro-controller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include executable code, functions, instructions, operating systems, and/or the like that allow a user to login with credentials to use the information handling devices 102.

In one embodiment, the login apparatus 104 is configured to anticipate or predict when a user is likely to login to a computing device, and, prior to the user logging in, preemptively executing various applications, services, and/or the like that the user typically uses when he is logged into the computing device. The login apparatus 104, in certain embodiments, tracks a user's usage pattern of an information handling device 102 over a period of time while the user uses the information handling device 102. In further embodiments, the login apparatus 104 predicts a time that the user is likely to login to the information handling device 102 based on the user's usage pattern of the information handling device 102. In some embodiments, the login apparatus 104 executes one or more applications that the user is likely to use at the predicted time, based on the user's usage pattern, prior to the user logging in to information handling device 102. The login apparatus 104, including its various sub-modules, may be located on one or more information handling devices 102 in the system 100, one or more servers 108, one or more network devices, and/or the like. The login apparatus 104 is described in more detail below with reference to FIGS. 2 and 3.

In one embodiment, the login apparatus 104 provides a solution over conventional device login systems for devices by preemptively executing applications and services, opening documents and websites, and/or the like prior to the user logging into the device such that when the user logs into the device, the user's session is ready. In other words, after the user logs into the device he does not have to manually start the applications that he normally uses, or open documents that he typically works on, or browse to websites that he regularly visits, which all takes time to load, and is the conventional process after logging in. Instead, the login apparatus 104 tracks how the user uses the device, anticipates the user's login of the device based on the usage data, and prepares the user's session, e.g., by executing applications that the usage data indicates the user typically uses, before the user logs in so that the user does not have to take additional time getting his session ready for use.

In various embodiments, the login apparatus 104 may be embodied as a hardware appliance that can be installed or deployed on an information handling device 102, on a server 108, or elsewhere on the data network 106. In certain embodiments, the login apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the login apparatus 104 may include a power interface, a wired and/or wireless network interface, a graphical interface that attaches to a display, and/or a semiconductor integrated circuit device as described below, configured to perform the functions described herein with regard to the login apparatus 104.

The login apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a micro-controller, an application-specific integrated circuit ("ASIC"), a processor, a processor core, or the like. In one embodiment, the login apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the login apparatus 104.

The semiconductor integrated circuit device or other hardware appliance of the login apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the login apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102, e.g., usage pattern data describing the user's use of an information handling device 102.

Figure 2:
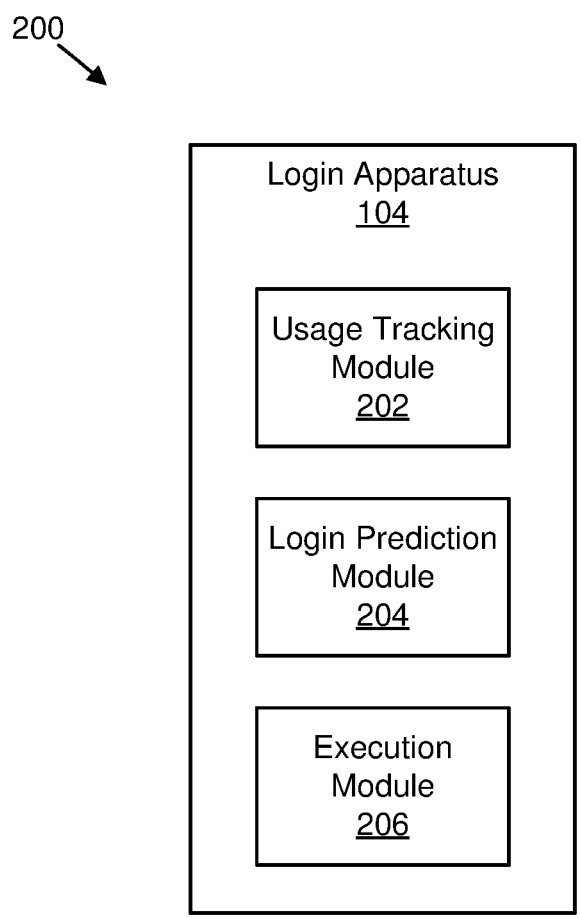
FIG. 2 is a schematic block diagram illustrating one embodiment of an apparatus for executing applications prior to user login.

FIG. 2 is a schematic block diagram illustrating one embodiment of an apparatus 200 for executing applications prior to user login. In one embodiment, the apparatus 200 includes an embodiment of a login apparatus 104. The login apparatus 104, in some embodiments, includes one or more of a usage tracking module 202, a login prediction module 204, and an execution module 206, which are described in more detail below.

The usage tracking module 202, in one embodiment, is configured to track a user's usage pattern of an information handling device 102 over a period of time while the user uses the information handling device 102. As used herein, a user's usage pattern of the information handling device 102 describes the user's use of the information handling device 102, e.g., the how, when, where, and what of the user's use. The usage tracking module 202, in one embodiment, tracks which users log into the information handling device 102, the times the users log into the information handling device 102, the location of the users when they log into the information handling device 102, and/or the like.

The usage tracking module 202, in certain embodiments, monitors the user's active use of the information handling device 102 and stores data associated with the user's use of the information handling device 102. For example, the usage tracking module 202 may register to receive notifications, signals, and/or the like when the operating system for the information handling device 102 detects certain events of interest, such as when the user executes or runs applications/programs, when an application window becomes active, when a webpage is opened, when a document is opened, and/or the like.

In further embodiments, the usage tracking module 202 collects data related to the foregoing events such as how long a user actively uses an application (e.g., how long a user is actively interacting with an application), the schedule of when the user uses certain applications (e.g., the time and day that the user uses applications), the user's location when applications are used, the number of times that a user runs/executes an application, and/or the like. The usage tracking module 202 may continuously collect usage data while the user uses the information handling device 102, may collect data at predetermined intervals, and may collect data in response to certain events, e.g., running an application, opening a document, and/or the like.

Furthermore, the usage tracking module 202 may monitor operating system services and/or other applications that the user uses either directly or indirectly to determine which services are necessary to get the information handling device 102 to a state that the user can use it productively. For example, the usage tracking module 202 may determine that the user rarely uses a printing service that is used to facilitate communications with a printer, but needs various networking services to be started to connect to and use data networks 106 that are necessary for the user's use of the information handling device 102.

In one embodiment, the usage tracking module 202 stores the collected data in a database, data store, log file, and/or the like on persistent storage of the information handling device 102. In certain embodiments, the usage tracking module 202 stores the collected data in cloud storage, on a remote server 108, and/or the like, which is accessible to the information handling device 102 over a data network 106.

In one embodiment, the login prediction module 204 is configured to predict a time that the user is likely to login to the information handling device 102 based on the user's usage pattern of the information handling device 102. In other words, based on the usage data that the usage tracking module 202 collects, the login prediction module 204 predicts, forecasts, estimates, and/or the like which users are likely to use the information handling device 102 at a certain time.

For example, the login prediction module 204, based on the usage data, may determine that user A typically logs into a desktop computer at his office on weekdays between 8:00 AM and 9:00 AM, at 1:00 PM, and at 3:15 PM. At home, user A may log into his home desktop computer at 9:00 PM, while user B logs typically logs into the home desktop computer at 9:30 AM, and 2:00 PM, and so on.

The execution module 206, in one embodiment, is configured to execute one or more applications that the user is likely to use at the predicted time, automatically based on the user's usage pattern data, prior to the user logging into the information handling device 102. For instance, continuing with the example above, when the information handling device 102 is powered on, the login prediction module 204 may check the time and determine that user A is likely to login into the information handling device 102 at that time. Accordingly, the execution module 206 may check the usage pattern data to determine which applications the user typically executes when he first uses the information handling device 102, which webpages the user typically opens, which documents, e.g., the most recent documents the user is using, which services are necessary to get the information handling device 102 to a usable state, and/or the like.

For example, the execution module 206 may determine that the user typically opens Google Chrome®, Microsoft Word®, and Microsoft Excel® after he logs into the operating system running on the information handling device 102. Furthermore, the execution module 206 may open the webpages that the user last had open in the web browser, may open the most recent documents the user was working in in Office® and Excel®, and/or the like, based on the usage pattern data that the usage tracking module 202 collects.

The execution module 206 executes applications, starts services, opens webpages and/or documents, and/or the like, for the user that is likely to login at a certain time prior to or before the user logs into the information handling device 102. For instance, the execution module 206 may initiate or execute a background process or user session by the operating system for the user that the login prediction module 204 indicates is likely to login at the given time. Within the background user session, the execution module 206 may execute applications, services, open documents, open webpages, and/or the like that the user typically uses, based on the usage pattern data, before the user logs into the operating system so that when the user logs in, the user's session will be ready and the user will not have to manually load applications that he typically uses and wait for the applications to load.

In one embodiment, the execution module 206 executes one or more applications that the user typically uses (e.g., starts a user session for the user) in response to a login screen being presented to the user, e.g., an operating system login screen, and/or detecting a startup event for the information handling device, e.g., a boot operation, a restart operation, a wake-from-sleep operation, and/or the like.

Figure 3:
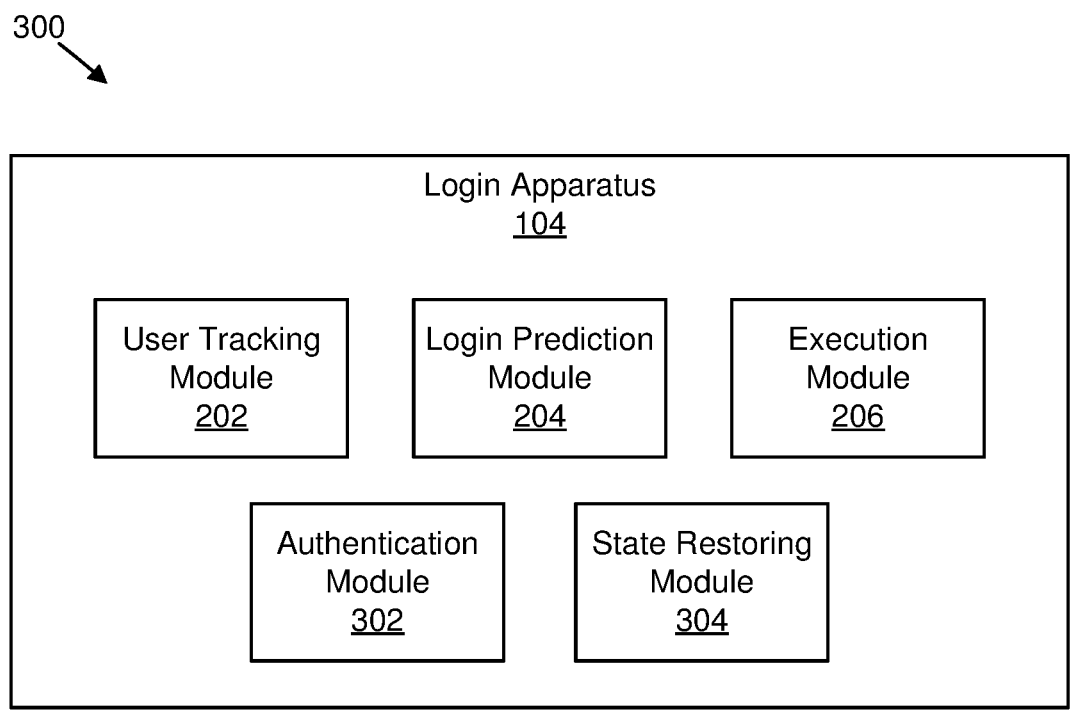
FIG. 3 is a schematic block diagram illustrating one embodiment of another apparatus for executing applications prior to user login.

FIG. 3 is a schematic block diagram illustrating one embodiment of an apparatus 300 for executing applications prior to user login. In one embodiment, the apparatus 300 includes an embodiment of a login apparatus 104. The login apparatus 104, in some embodiments, includes one or more of a usage tracking module 202, a login prediction module 204, and an execution module 206, which may be substantially similar to the usage tracking module 202, the login prediction module 204, and the execution module 206 described above with reference to FIG. 2. In further embodiments, the login apparatus 104 includes one or more of an authentication module 302 and a state restoring module 304, which are described in more detail below.

In one embodiment, authentication module 302 is configured to provide credentials to one or more applications that require credentials for authenticating the user to use the one or more applications. For example, an email application may require the user to enter credentials to access the user's email account. Accordingly, the usage tracking module 202 may record the user credentials, e.g., username and password, when the user enters the credentials, and the authentication module 302 may provide the credential information for the user's email account in response to the execution module 206 executing the email application prior to the user logging into the information handling device.

Similarly, the authentication module 302 may provide credential information to a web browser application for logging into one or more webpages that the user visits, e.g., social media applications such as Facebook®, Twitter®, and/or the like, to an active directory service, to a remote server, and/or other services/applications that may require authentication information to be useable.

In one embodiments, the state restoring module 304 is configured to restore a state of the one or more applications, based on the user's usage pattern data, in response to the one or more applications being executed prior to the user logging into the information handling device 102. The application state may refer to the position of an application window on the graphical desktop, the size of the application window, making an application window the active application window if the application was the most recently used application, opening websites in a web browser in the same order/arrangement that the websites were previously in, opening documents that the user is likely to use, and/or the like.

The usage tracking module 202 may track state information related to the state of each of the applications continuously, at predefined intervals, in response to application events (e.g., a window move event, a window resize event, a document open or close event, and/or the like), and the state restoring module 304 may use the tracked state information to restore the state of the executed applications to a previous state prior to the information handling device 102 being powered down, for example.

Figure 4:
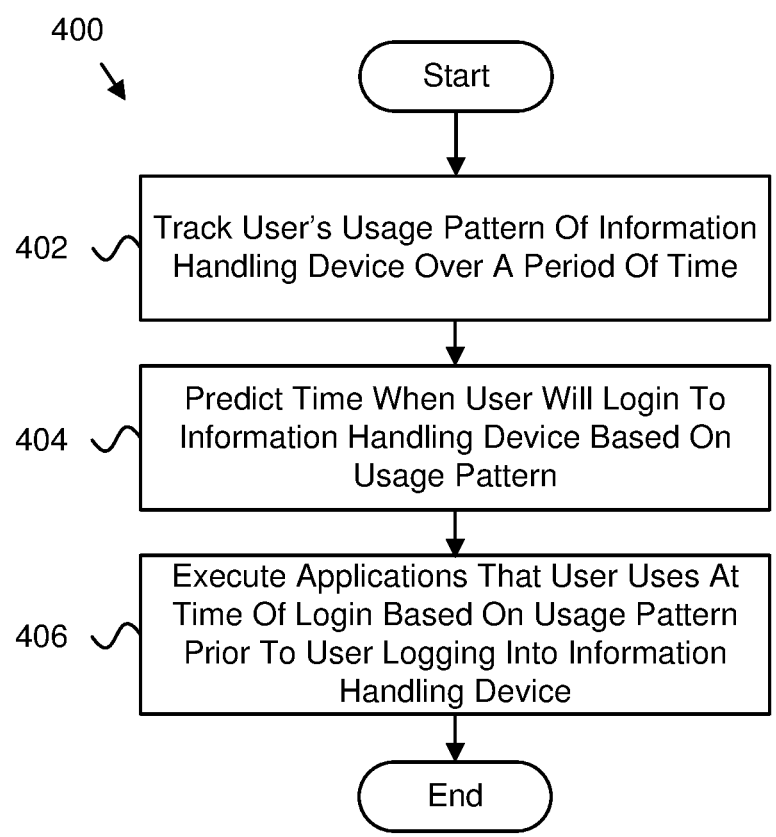
FIG. 4 is a schematic flow chart diagram illustrating one embodiment of a method for executing applications prior to user login.

FIG. 4 is a schematic flow chart diagram illustrating one embodiment of a method 400 for executing applications prior to user login. In one embodiment, the method 400 begins and the usage tracking module 202 tracks 402 a user's usage pattern of an information handling device 102 over a period of time while the user uses the information handling device 102. In certain embodiments, the login prediction module 204 predicts 404 a time that the user is likely to login to the information handling device 102 based on the user's usage pattern of the information handling device 102. In further embodiments, the execution module 206 executes 406 one or more applications that the user is likely to use at the predicted time, based on the user's usage pattern, prior to the user logging into information handling device 102, and the method 400 ends.

Figure 5:
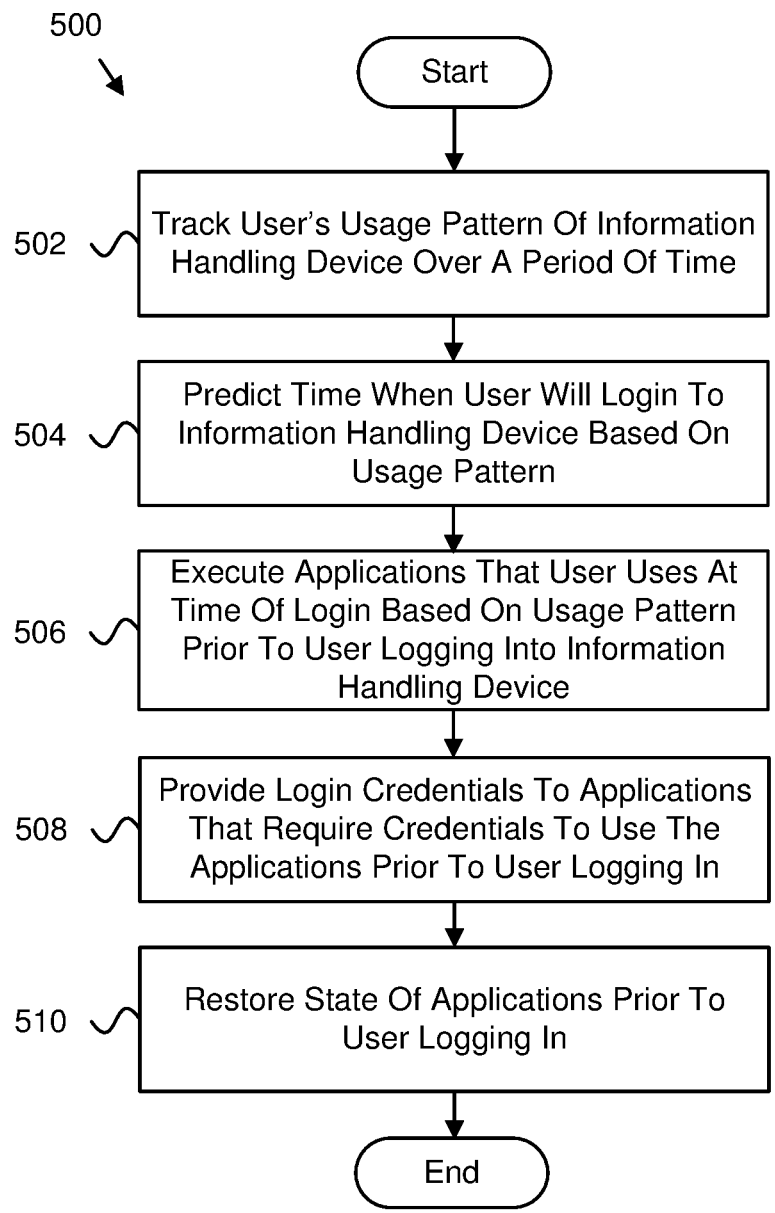
FIG. 5 is a schematic flow chart diagram illustrating one embodiment of another method for executing applications prior to user login.

FIG. 5 is a schematic flow chart diagram illustrating one embodiment of another method 500 for executing applications prior to user login. In one embodiment, the method 500 begins and the usage tracking module 202 tracks 502 a user's usage pattern of an information handling device 102 over a period of time while the user uses the information handling device 102. In certain embodiments, the login prediction module 204 predicts 504 a time that the user is likely to login to the information handling device 102 based on the user's usage pattern of the information handling device 102. In further embodiments, the execution module 206 executes 506 one or more applications that the user is likely to use at the predicted time, based on the user's usage pattern, prior to the user logging into information handling device 102.

In one embodiment, the authentication module 302 provides 508 credentials to one or more applications that require credentials for authenticating the user to use the one or more applications. In various embodiments, the state restoring module 304 restores 510 a state of the one or more applications, based on the user's usage pattern, in response to the one or more applications being executed prior to the user logging into the information handling device 102, and the method 500 ends.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
    an information handling device;
    a processor of the information handling device; and
    a memory that stores code executable by the processor to:
        track a user's usage pattern of the information handling device over a period of time while the user uses the information handling device;
        predict a time that the user is likely to login to the information handling device based on the user's usage pattern of the information handling device;
        determine one or more applications that the user is likely to use at the predicted time based on the user's usage pattern, wherein at least one of the one or more applications requires credentials for logging the user into a user account associated with the at least one application;
        provide previously stored credentials to the at least one application that requires credentials for authenticating the user; and
        execute the one or more applications that the user is likely to use at the predicted time, including the at least one application that requires credentials using the provided stored credentials, prior to the user logging into the information handling device.

2. The apparatus of claim 1, wherein the one or more applications are executed in a background process of an operating system executing on the information handling device.

3. The apparatus of claim 1, wherein the one or more applications are executed in response to one of a login screen being presented to the user and a startup event for the information handling device being detected.

4. The apparatus of claim 1, wherein the user's usage pattern of the information handling device is tracked according to one or more of the user executing an application, on an on-going basis, and at predefined intervals.

5. The apparatus of claim 1, further comprising code executable by the processor to execute one or more services for an operating system executing on the information handling device prior to the user logging into the information handling device.

6. The apparatus of claim 1, further comprising code executable by the processor to restore a state of the one or more applications, based on the user's usage pattern, in response to the one or more applications being executed prior to the user logging into the information handling device.

7. The apparatus of claim 6, wherein restoring the state of the one or more applications comprises one or more of opening websites that the user is likely to view, opening documents that the user is likely to use, and positioning application windows in a graphical user interface at locations where the user is likely to place the application windows.

8. The apparatus of claim 1, wherein the one or more applications are executed prior to the user logging into an operating system executing on the information handling device.

9. The apparatus of claim 1, wherein tracking the user's usage pattern comprises tracking a schedule of when the user one or more of actively uses an application, executes an application, opens a webpage, opens a document, and provides credentials for authentication.

10. The apparatus of claim 1, wherein the at least one application that requires credentials for authenticating the user comprises a web browser, the web browser using the credentials for logging into one or more webpages.

11. A method comprising:
    tracking, by a processor, a user's usage pattern of an information handling device over a period of time while the user uses the information handling device;
    predicting a time that the user is likely to login to the information handling device based on the user's usage pattern of the information handling device;
    determining one or more applications that the user is likely to use at the predicted time based on the user's usage pattern, wherein at least one of the one or more applications requires credentials for logging the user into a user account associated with the at least one application;
    providing previously stored credentials to the at least one application that requires credentials for authenticating the user; and
    executing the one or more applications that the user is likely to use at the predicted time, including the at least one application that requires credentials using the provided stored credentials, prior to the user logging into the information handling device.

12. The method of claim 11, further comprising executing the one or more applications in a background process of an operating system executing on the information handling device.

13. The method of claim 11, further comprising executing the one or more applications in response to one of presenting a login screen to the user and detecting a startup event for the information handling device.

14. The method of claim 11, wherein the user's usage pattern of the information handling device is tracked according to one or more of the user executing an application, on an on-going basis, and at predefined intervals.

15. The method of claim 11, further comprising executing one or more services for an operating system executing on the information handling device prior to the user logging into the information handling device.

16. The method of claim 11, further comprising restoring a state of the one or more applications, based on the user's usage pattern, in response to the one or more applications being executed prior to the user logging into the information handling device.

17. The method of claim 16, wherein restoring the state of the one or more applications comprises one or more of opening websites that the user is likely to view, opening documents that the user is likely to use, and positioning application windows in a graphical user interface at locations where the user is likely to place the application windows.

18. The method of claim 11, wherein tracking the user's usage pattern comprises tracking a schedule of when the user one or more of actively uses an application, executes an application, opens a webpage, opens a document, and provides credentials for authentication.

19. The method of claim 11, wherein the at least one application that requires credentials for authenticating the user comprises a web browser, the web browser using the credentials for logging into one or more webpages.

20. A program product comprising a computer readable storage medium that stores code executable by a processor, the executable code comprising code to perform:

tracking a user's usage pattern of an information handling device over a period of time while the user uses the information handling device;

predicting a time that the user is likely to login to the information handling device based on the user's usage pattern of the information handling device;

determining one or more applications that the user is likely to use at the predicted time based on the user's usage pattern, wherein at least one of the one or more applications requires credentials for logging the user into a user account associated with the at least one application;

providing previously stored credentials to the at least one application that requires credentials for authenticating the user; and executing the one or more applications that the user is likely to use at the predicted time, including the at least one application that requires credentials using the provided stored credentials, prior to the user logging into the information handling device.

* * * * *